(12) United States Patent
Hubbard (10) Patent No.: US 8,544,707 B2
(45) Date of Patent: Oct. 1, 2013

(54) RESILIENT INFILL

(75) Inventor: Peter Douglas Hubbard, Christchurch (NZ)

(73) Assignee: Yakima Innovation Development Corporation, Georgetown (KY)

( * ) Notice: Subject to any disclaimer, the term of this patent is extended or adjusted under 35 U.S.C. 154(b) by 302 days.

(21) Appl. No.: 12/679,431

(22) PCT Filed: Sep. 15, 2008

(86) PCT No.: PCT/NZ2008/000235
§ 371 (c)(1),
(2), (4) Date: Aug. 13, 2010

(87) PCT Pub. No.: WO2009/038479
PCT Pub. Date: Mar. 26, 2009

(65) Prior Publication Data
US 2010/0308091 A1    Dec. 9, 2010

(30) Foreign Application Priority Data

Sep. 21, 2007 (NZ) ........................................ 561809

(51) Int. Cl.
*B60R 9/05* (2006.01)
(52) U.S. Cl.
USPC .......................... 224/316; 224/309; 296/180.1
(58) Field of Classification Search
USPC ................. 224/325, 309, 315, 316, 318, 326; 296/180.1
See application file for complete search history.

(56) References Cited

U.S. PATENT DOCUMENTS

| | | | | |
|---|---|---|---|---|
| 3,606,432 A * | 9/1971 | Honatzis | ........................ | 293/128 |
| 5,025,967 A * | 6/1991 | Cronce et al. | ................. | 224/326 |
| 5,207,365 A * | 5/1993 | Bott | .............................. | 224/316 |
| 5,282,560 A * | 2/1994 | Ozog | ............................ | 224/316 |
| 5,294,033 A * | 3/1994 | Duemmler | .................... | 224/316 |
| 5,474,218 A * | 12/1995 | Arsenault et al. | ............. | 224/316 |
| 6,176,404 B1 * | 1/2001 | Fourel | ........................... | 224/309 |
| 6,276,747 B1 * | 8/2001 | Ogawa et al. | ................ | 296/180.1 |
| 6,796,471 B2 * | 9/2004 | Aftanas et al. | ............... | 224/321 |

FOREIGN PATENT DOCUMENTS

| | | | |
|---|---|---|---|
| AU | 2006100386 A4 * | 6/2006 | |
| DE | 3209912 A1 * | 10/1983 | |
| DE | 202005007566 U1 | 7/2005 | |

(Continued)

OTHER PUBLICATIONS

International Search Report dated Jan. 7, 2009 for application No. PCT/NZ2008/000235.

(Continued)

*Primary Examiner* — Nathan J Newhouse
*Assistant Examiner* — Todd Anderson
(74) *Attorney, Agent, or Firm* — Kolisch Hartwell, P.C.

(57) ABSTRACT

The invention relates to a resilient infill for positioning in a channel in a crossbar of a roof rack or load carrier. The infill comprises a flexible upper portion and a base comprising a bottom. A pair of flexible, opposing side walls extend from the bottom and curve upwardly and outwardly to meet with outer edges of the flexible upper portion. The width of the upper portion is greater than the width of the bottom and the infill has a substantially hollow interior. The infill is compressible and makes minimal wind noise when positioned in the crossbar of a roof rack located on a moving vehicle.

19 Claims, 5 Drawing Sheets

(56) References Cited

FOREIGN PATENT DOCUMENTS

| FR | 2632595 A | 12/1989 |
| WO | 91/10581 A1 | 7/1991 |
| WO | 99/54168 A1 | 10/1999 |
| WO | WO 9954168 A1 * | 10/1999 |

OTHER PUBLICATIONS

International Preliminary Report on Patentability dated Jul. 28, 2009 for application No. PCT/NZ2008/000235.
European Patent Office, Office Action regarding European Patent Application No. 08831383.8, Feb. 14, 2013, 4 pages.

* cited by examiner

RESILIENT INFILL

FIELD

The present disclosure relates to a vehicle roof rack or load carrier, and particularly relates to a resilient infill for a roof rack crossbar and a roof rack crossbar comprising such a resilient infill.

BACKGROUND

Roof racks are well known and are manufactured in a variety of configurations. Typically, roof racks include a crossbar with a leg at each end of the crossbar, the legs being used to support the crossbar and attach the crossbar to the roof of a vehicle. The legs are spaced apart from each other a selected distance. Generally, the distance between the legs is determined by the width of the vehicle to which the roof rack is to be mounted.

A load or item may be attached to the crossbar. In one known arrangement, the crossbar of the roof rack includes a channel, which extends along the length of the crossbar. The peripheral surfaces of the channel are defined by a floor having two opposing side walls and a partial ceiling defined by two opposing lips with an opening in between. The opening in the channel allows one or more equipment brackets to be mounted to the crossbar to attach one or more items to the roof rack.

However, in this arrangement, the opening between the lips of the channel creates an exposed channel in the crossbar. The exposed channel creates wind turbulence, and hence wind noise, when the vehicle is travelling. This is generally overcome by placing a compressible resilient infill within the channel. The infill is generally hollow to assist its compressibility. The infill has a shape that substantially corresponds with the interior shape of the channel so that the infill slidingly engages with the peripheral surfaces of the channel.

In one example, as disclosed in WO 99/54168, the infill has a cross-sectional shape of a hollow inverted "T". The upper portion of the infill extends through the opening between the lips of the channel and substantially conforms with the upper surface of the crossbar.

Mounting brackets can be attached to the crossbar by positioning the attachment foot of the bracket between the infill and the lips of the channel.

Resilient infills for crossbars are typically made of flexible material such that the infill can be locally compressed to allow for mounting brackets to be attached to the crossbar, whilst still retaining the same uniform external shape over the rest of the length of the infill. However, a disadvantage of known infills is that the infills can be difficult to compress. As such, it can be difficult to attach a mounting bracket between the infill and the lips of the channel. Furthermore, the step between the upper surface of the infill and the upper surface of the crossbar creates an airtrap that causes wind noise when a vehicle, carrying a roofrack with infill, is moving.

SUMMARY

In some embodiments, a resilient infill for positioning in a channel in a crossbar of a roof rack is disclosed. The channel includes a longitudinal opening defined by opposing lips having tapered inner surfaces. The infill includes: a flexible upper portion; and a base including a bottom and a pair of flexible opposing side walls extending from the bottom and curving upwardly and outwardly to meet with outer edges of the flexible upper portion; wherein the upper portion has a width greater than the width of the bottom and the upper portion includes an upper surface, at least a portion of which is shaped to correspond with the tapered inner surfaces of the opposing lips of the crossbar channel; and wherein the infill has a substantially hollow interior.

Preferably, the opposing curved side walls have an apex that is higher than the outer edges of the upper portion.

The resilient infill may be made from an extrusion of either rubber or plastic.

In some embodiments, a crossbar of a vehicle roof rack or load carrier is disclosed. The crossbar includes a resilient infill as described herein.

Preferably, the crossbar has an aerodynamic cross-sectional shape.

More preferably, the crossbar includes a longitudinal channel having a longitudinal opening defined by opposing lips, the opposing lips having tapered inner surfaces. In these embodiments, the resilient infill is positioned within the channel. The infill has an upper surface corresponding with and contacting the tapered inner surfaces of the opposing lips.

In some embodiments, the flexible upper portion has an upper surface with an at least partially exposed substantially flat region and wherein the substantially flat region of the infill is substantially flush with the upper surface of the crossbar.

In some embodiments, the crossbar includes an upper surface with a longitudinal channel therein having a longitudinal opening defined by opposing lips. Each lip has a curved edge with a tight radius of curvature. The infill touches the lips at or near the curved edges of the lips such that the upper surface of the crossbar and upper surface of the resilient infill are substantially flush with each other.

In some embodiments, a roof rack is disclosed, the roof rack including a resilient infill as disclosed herein.

The term "roof rack" as used herein should be interpreted to include the similar term "load carrier".

Similarly, the term "crossbar" is to be interpreted broadly to include a roof rail or any load carrying apparatus configured to be releasably clamped or attached to a roof rack leg.

The term "comprising" as used in this specification and claims should be interpreted to mean "consisting at least in part of" or "comprising". That is, when interpreting independent claims comprising that term, the features prefaced by that term in each claim all need to be present but other features can also be present. Variants, such as "comprised" and "comprises" are to be interpreted in the same manner.

BRIEF DESCRIPTION OF THE DRAWINGS

Further features of the instant disclosure will become apparent from the following description, which is given by way of example only and with reference to the accompanying drawings in which.

DETAILED DESCRIPTION

Figure 1:
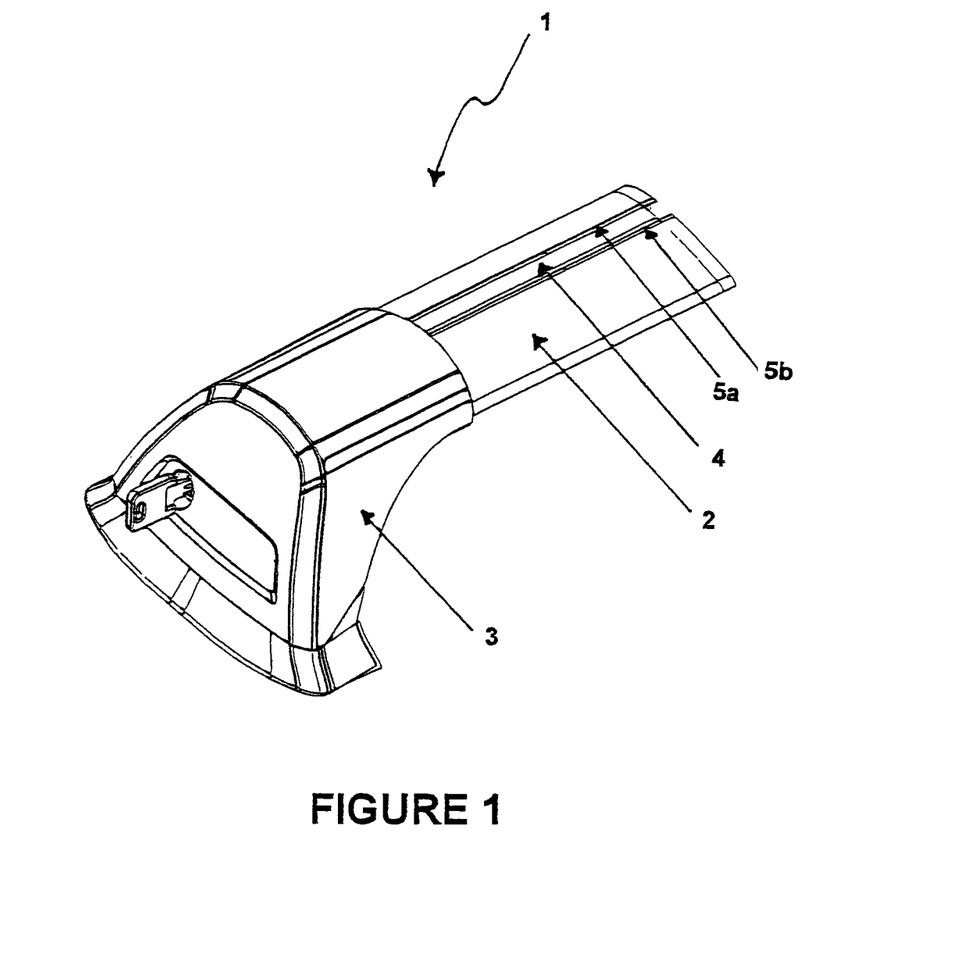
FIG. 1 is a perspective view of a section of a roof rack according to embodiments described herein.

FIG. 1 shows a perspective view of a portion of a roof rack or load carrier 1 according to embodiments described herein.

The roof rack 1 includes a crossbar 2 supported by a leg assembly 3, which attaches to and supports the crossbar above the roof of a vehicle.

Figure 2:
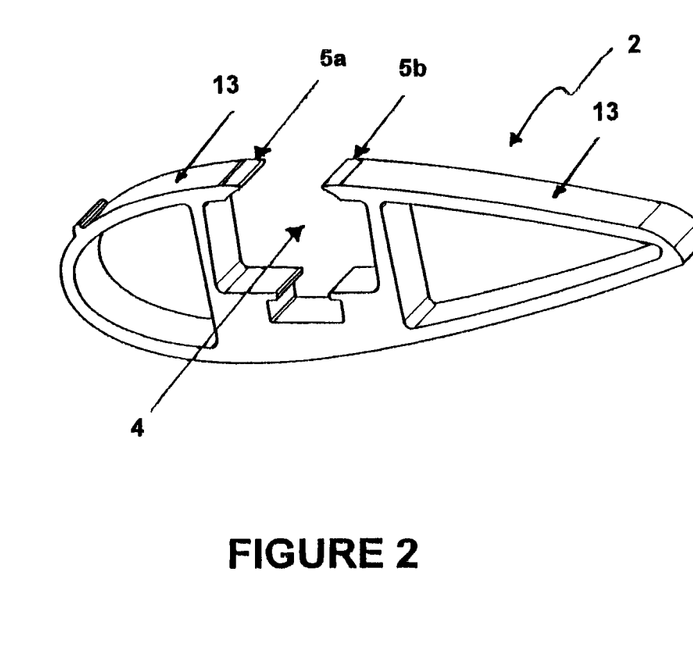
FIG. 2 is a perspective view of a portion of a crossbar for a roof rack according to embodiments described herein.

Ideally, the crossbar has an aerodynamic cross-sectional shape, such as an aerofoil shape, as illustrated in FIG. 2. An aerodynamic cross-sectional shape aids in the efficiency of the crossbar as it moves through the air while the vehicle is moving, and also reduces wind noise resulting from air turbulence created by the crossbar 2.

The crossbar 2 includes a longitudinal channel 4 having interior surfaces defined by a floor, or base portion, opposing side walls that extend from the floor, and a partial ceiling defined by longitudinal opposing lips 5a, 5b. The opposing lips 5a, 5b extend along the length of the crossbar 2 and define a longitudinal opening giving access to the channel 4 on the upper surface of the crossbar. The opposing lips 5a, 5b have tapered inner surfaces. Preferably, each of the lips 5a, 5b have a curved edge having a very small radius of curvature for reasons that will be described below. The edge of each lip 5a, 5b should be of the smallest radius possible without risking the edge being sharp and consequently damaging the infill, when fitted in the crossbar.

Special mounting brackets (not shown) can be attached to the crossbar 2 via the channel 4.

Figure 3:
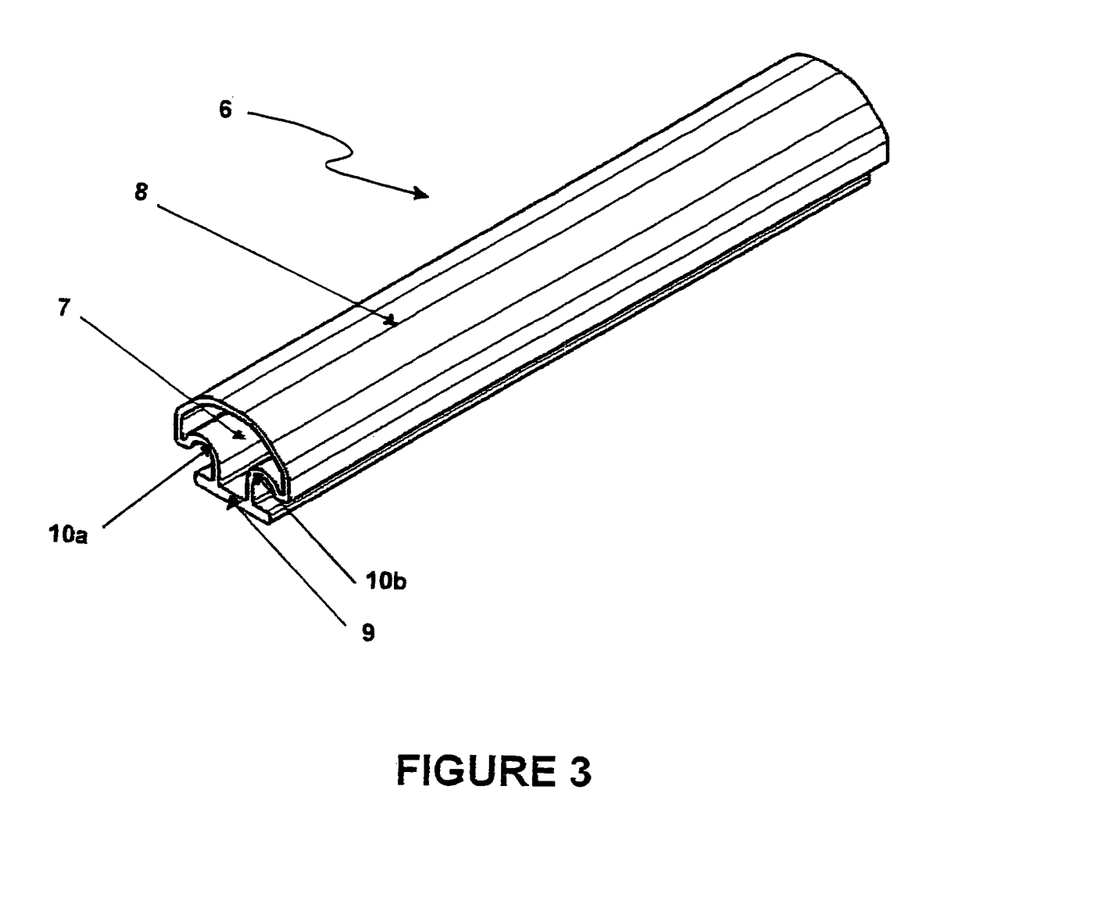
FIG. 3 is a perspective view of the resilient infill according to embodiments described herein.
Figure 4:
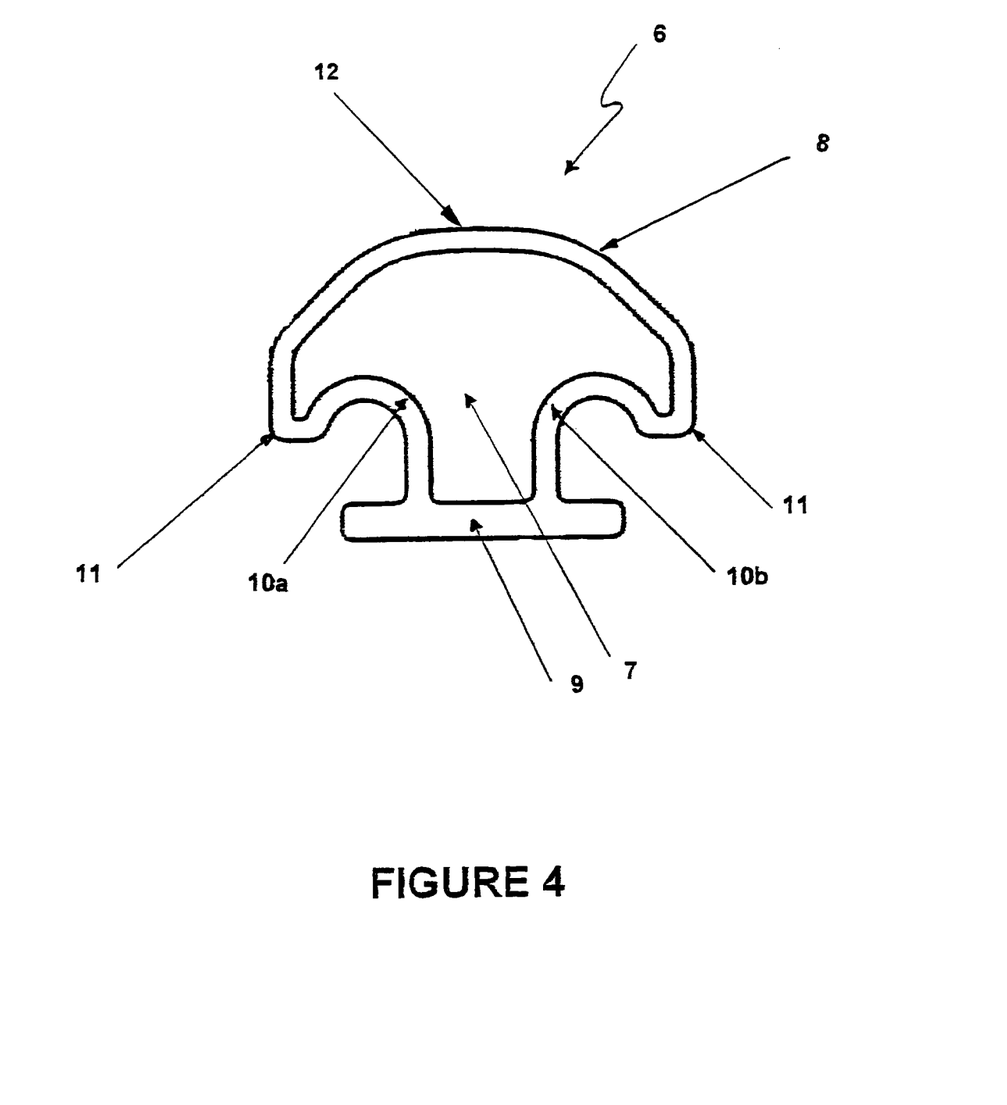
FIG. 4 is a cross-sectional view of the resilient infill of FIG. 3.

FIGS. 3 and 4 show a resilient infill 6, according to embodiments described herein. The infill is adapted to be inserted into the channel 4 by sliding the infill into the channel at one end of the crossbar.

The infill 6 has a hollow interior 7 and a flexible upper portion 8 having an external surface that is shaped to substantially correspond with the tapered inner surfaces of the opposing lips 5a, 5b. In the preferred form, the upper portion 8 has a substantially flat upper surface 12 with convex sides extending downwardly from the top to terminate at the lower edges 11 of the upper portion 8. Alternatively, the whole of the upper portion may be substantially curved.

Figure 5:
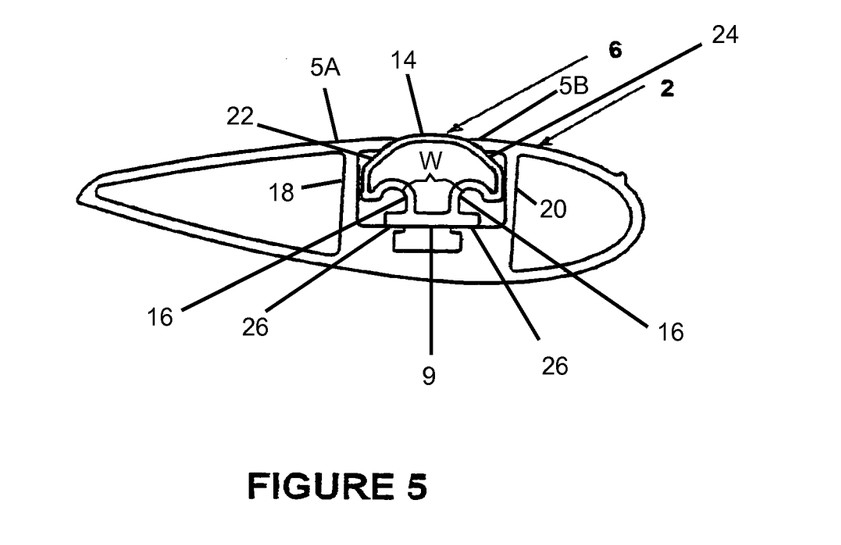
FIG. 5 is an end view of a crossbar containing a resilient infill according to embodiments described herein.

Once the infill is inserted in the channel, a portion of the infill 6 is exposed by the opening in the crossbar 2 between the opposing lips 5a, 5b, as shown in FIG. 5. The shape of the external surface of the upper portion 8 of the infill 6 and the small radius of the edges of the crossbar lips 5a, 5b, allows the exposed portion of the upper surface 12 of the infill 6 to be substantially flush with the upper surface 13 of the crossbar 2. This minimises the step between the exposed upper surface of the infill 6 and the upper surface of the crossbar 2. Consequently, only a very small airtrap or cavity is formed between the upper surface of the infill and the upper surface of the crossbar. As such, the substantially flush upper surface of the crossbar and infill combination creates less wind noise (or cavity noise) than conventional crossbar and infill combinations.

In some embodiments described herein, the curved edges of the crossbar lips 5a, 5b have such a tight radius of curvature, that the infill is able to touch the edges of the lips 5a, 5b only at or near the very top of the lips, thereby creating only a very small cavity between the infill 6 and the lips 5a, 5b.

The infill 6 also includes a bottom 9 which is shaped to allow the infill to be seated on the base portion or floor of the channel 4 in the crossbar 2.

The upper portion 8 of the infill 6 is supported by a base that includes a bottom 9 that is connected to the top or upper portion 8 by a pair of opposing curved flexible outer walls 10a and 10b. The walls 10a and 10b extend upwardly from the bottom 9 and substantially curve outwards from the bottom 9 to the lower outer edges 11 of the upper portion 8 of the infill 6. The curved outer walls may have an apex that is higher than the outer edges of the upper portion. In other words, the curved outer walls 10a and 10b curve back on themselves before joining with the outer edges 11 of the upper portion 8. As shown in FIGS. 4-5, outer edges 11 of top portion 8 may form lower boundaries of opposing side panels of resilient infill 6. As shown in FIGS. 2 and 5, channel 4 may include a cavity having a rectangular cross section and opposing side walls, and the opposing side panels of resilient infill 6 may contact the opposing side walls of the cavity of channel 4. As also shown in FIG. 5, each side wall of the cavity of channel 4 may have a lower portion and an upper portion and at least one of the side panels of top portion 8 of resilient infill 6 may be in contact with the upper portion of one of the side walls of the cavity of channel 4. As shown in FIGS. 2 and 5, bottom 9 (or bottom floor portion) may have a width that is approximately equal to a width of the longitudinal opening defined between opposing lips 5a, 5b.

The outer edges 11 of the upper portion of the infill are higher than the bottom of the infill such that, when the infill is seated in the channel 4 of the crossbar, a compression space is provided between the outer edges 11 and the base portion or floor of the channel. In some embodiments, the width of the upper portion 8 is greater than the width of the bottom 9. As shown in FIGS. 2 and 5, the cavity of channel 4 of crossbar 2 has lower cavity corners, the lower cavity corners having volumes, and resilient infill 6 does not fill the volumes of the lower cavity corners.

The infill 6 can be made from an extrusion of rubber or plastic.

In use, the infill 6 is positioned within the channel 4 in the crossbar 2, as shown in FIG. 5. The convex sides of the upper portion 8 of the infill 6 press against the tapered inner surfaces of the opposing lips 5a, 5b of the channel 4. The exposed portion of the top surface 12 of the infill is substantially flush with the upper surface 13 of the crossbar 2. As shown in FIG. 5, resilient infill 6 has an interior volume, the cavity of crossbar 2 has an upper space, and most of the interior volume of resilient infill 6 is disposed in the upper space of the cavity of crossbar 2.

The positioning of the infill in the channel 4 causes the infill to substantially seal the opening in the crossbar caused by the channel 4. Therefore, the infill 6 provides the crossbar 2 with a substantially uniform upper surface. This prevents unwanted drag and wind noise when the vehicle is moving. The infill 6 is locally collapsible so that the infill can be depressed to allow a mounting bracket to be attached to the crossbar 2 via the channel 4.

The curved nature of the side walls 10a, 10b of the infill 6 allows the infill to collapse when downward pressure is applied to the upper portion 8. The compression space between the base portion of the channel 4 and the outer edges 11 of the upper portion 8 of the infill 6 allows the upper portion 8 to collapse downwardly and fill that space when downward force is applied to the infill. As shown in FIGS. 2, 4, and 5, at least one of the side panels of top portion 8 of resilient infill 6 may be configured to permit movement of the side panel downward along the respective side wall of the cavity when the infill is compressed. The flexible nature of the upper portion 8 allows the upper portion 8 to collapse into the hollow interior 7 of the infill 6.

The combined nature of the collapsible upper portion 8, the collapsible curved side walls 10a, 10b, and the compression space, means that the infill is able to be compressed to a greater degree than conventional infills. This makes it relatively easy to insert a mounting bracket into the channel 4.

Furthermore, the infill 6 of the present invention described herein is resilient and is able to substantially return to its original shape after long periods of compression. The infill 6 will maintain the integrity of the external profile of the upper surface of the crossbar 2, even after a mounting bracket has been attached to the crossbar and then removed after a long period of time.

Finally, the arrangement of the infill 6 described herein with a crossbar having lips with edges of a very small radius, provides a crossbar and infill combination that creates minimal wind noise when a vehicle, bearing a roofrack with the crossbar and infill combination, is moving.

While the resilient infill, crossbar, and roof rack described herein have been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details representative apparatus and method, and illustrative examples shown and described. Accordingly, departures may be made from such details without departure from the scope of the applicant's general inventive concept.

As shown in FIG. 5, infill 6 is a tree-shaped infill having a canopy portion 14 connected to bottom or base 9 by a trunk portion 16 to form a hollow interior. The canopy portion spans the channel (or cavity) from first opposing side wall 18 to second opposing side wall 20. Trunk portion 16 has a narrower horizontal width W than canopy portion 14 and base 9. Canopy portion 14 includes first and second branch portions 22 and 24. As shown, first branch portion 22 contacts first opposing side wall 18, but does not contact floor portion 26. Second branch portion 24 contacts second opposing side wall 20, but does not contact floor portion 26. A first portion of the hollow interior of infill 6 is disposed in first branch portion 22 and overhangs floor portion 26 under lip 5a. A second portion of the hollow interior of infill 6 is disposed in second branch portion 24 and overhangs floor portion 26 under lip 5b. As shown, base 9 has a first end portion disposed closer to first opposing side wall 18 than second opposing side wall 20, and a second end portion disposed closer to second opposing side wall 20 than first opposing side wall 18. First branch portion 22 overhangs the first end portion of base 9. Second branch portion 24 overhangs the second end portion of base 9.

What I claim is:

1. A vehicle rack crossbar system comprising:
   a crossbar having a longitudinal opening to a cavity having first and second opposing side walls connected to a floor portion, the opening having a width defined between opposing lips, the floor portion being connected to the opposing lips by the first and second opposing side walls; and
   a resilient infill having a base connected to an upper portion to form a hollow interior, wherein the upper portion has a greater horizontal width than the base, the base being seated on the floor portion of the cavity, the upper portion pressing upward on concavely curved edges of the opposing lips.

2. The vehicle rack crossbar system of claim 1, wherein the upper portion contacts the first and second opposing side walls of the cavity.

3. The vehicle rack crossbar system of claim 1, wherein upper portion includes convexly curved surfaces that press against the concavely curved edges of the opposing lips.

4. A vehicle rack crossbar system comprising:
   a crossbar having a longitudinal opening to a cavity having first and second opposing side walls connected to a floor portion, the opening having a width defined between opposing lips, the floor portion being connected to the opposing lips by the first and second opposing side walls; and
   a resilient infill having an upper portion connected to a base by a trunk to form a hollow interior, the upper portion pressing upward on the opposing lips, and having side portions which are hollow, contained in the cavity, and contacting the first and second side walls, the base being seated on the floor portion, and the trunk having a narrower horizontal width than the base and the upper portion.

5. The vehicle rack crossbar system according to claim 4, wherein the upper portion of the resilient infill has outer edges and the trunk of the resilient infill has first and second curved outer walls, the first curved outer wall having an apex that is higher than the outer edges of the upper portion and closer to the first opposing side wall than the second opposing side wall, the second curved outer wall having an apex that is higher than the outer edges of the upper portion and closer to the second opposing side wall than the first opposing side wall.

6. The vehicle rack crossbar system according to claim 4, wherein the resilient infill is made from an extrusion of either rubber or plastic.

7. The vehicle rack crossbar system of claim 4, wherein the resilient infill has an interior volume, the cavity of the crossbar has an upper space, and most of the interior volume of the resilient infill is disposed in the upper space of the cavity of the crossbar.

8. The vehicle rack crossbar system of claim 4, wherein the cavity of the crossbar has lower cavity corners, the lower cavity corners having volumes, and the resilient infill does not fill the volumes of the lower cavity corners.

9. A vehicle rack crossbar system comprising:
   a crossbar having a longitudinal opening to a cavity having first and second opposing side walls connected to a floor portion, the opening having a width defined between opposing lips, the floor portion being connected to the opposing lips by the first and second opposing side walls; and
   a resilient infill pressing upward on the opposing lips and being seated on the floor portion, the resilient infill having a base connected to an upper portion to form a hollow interior, wherein the upper portion has a greater horizontal width than the base, the resilient infill bridging an opening in the floor portion that leads to a secondary cavity.

10. The vehicle rack crossbar system according to claim 9, wherein the crossbar has an aerodynamic cross-sectional shape.

11. The vehicle rack crossbar system according to claim 10, wherein the opposing lips having tapered inner surfaces, a top portion of the resilient infill having an upper surface, the upper surface of the top portion of the resilient infill corresponding with and contacting the tapered inner surfaces of the opposing lips.

12. The vehicle rack crossbar system according to claim 11, wherein the upper surface of the top portion includes an at least partially exposed substantially flat region, the crossbar having an upper surface, and wherein the at least partially exposed substantially flat region of the resilient infill is substantially flush with the upper surface of the crossbar.

13. The vehicle rack crossbar system according to claim 10, wherein the opposing lips each have a concavely curved edge with a tight radius of curvature, the crossbar having an upper surface, the top portion of the resilient infill having an upper surface, and wherein the resilient infill touches the concavely curved edges of the lips such that the upper surface of the crossbar and upper surface of the resilient infill are substantially flush with each other.

14. The vehicle rack crossbar system of claim 9, wherein the resilient infill contacts the first and second opposing side walls of the cavity.

15. A vehicle rack crossbar system comprising:
   a crossbar having a longitudinal opening to a cavity having first and second opposing side walls connected to a floor portion, the opening having a width defined between opposing lips, the floor portion being connected to the opposing lips by the first and second opposing side walls; and
   a resilient infill having a base connected to a dome to form a hollow interior, the base being seated on the floor portion, the dome having a continuously convex upper surface that spans the cavity from the first opposing side wall to the second opposing side wall, the convex upper surface of the dome pressing upward on the opposing lips.

16. The vehicle rack crossbar system of claim 15, wherein the convex upper surface of the dome contacts concavely curved edges of the opposing lips.

17. A vehicle rack crossbar system comprising:
   a crossbar having a longitudinal opening to a cavity having first and second opposing side walls connected to a floor portion, the opening having a width defined between opposing lips, the floor portion being connected to the opposing lips by the first and second opposing side walls; and
   a tree-shaped resilient infill having a canopy portion connected to a base by a trunk portion to form a hollow interior, the base being seated on the floor portion of the cavity, the canopy portion spanning the cavity from the first opposing side wall to the second opposing sidewall and pressing upward on the opposing lips, the trunk portion having a narrower horizontal width than the canopy portion, the canopy portion including first and second branch portions, the first branch portion contacting the first opposing side wall but not contacting the floor portion, a first portion of the hollow interior being disposed in the first branch portion and overhanging the floor portion, the second branch portion contacting the second opposing side wall but not contacting the floor portion, a second portion of the hollow interior being disposed in the second branch portion and overhanging the floor portion.

18. The vehicle rack crossbar system of claim 17, wherein the trunk portion has a narrower horizontal width than the base, the base having a first end portion and a second end portion, the first end portion being disposed closer to the first opposing side wall than the second opposing side wall, the second end portion being disposed closer to the second opposing side wall than the first opposing sidewall, the first branch portion overhanging the first end portion of the base, the second branch portion overhanging the second end portion of the base.

19. The vehicle rack crossbar system of claim 17, wherein convex portions of the canopy press upward on concavely curved edges of the opposing lips.

* * * * *